United States Patent
Bowman et al.

(10) Patent No.: US 11,281,612 B2
(45) Date of Patent: Mar. 22, 2022

(54) SWITCH-BASED INTER-DEVICE NOTATIONAL DATA MOVEMENT SYSTEM

(71) Applicant: Dell Products L.P., Round Rock, TX (US)

(72) Inventors: Kurtis John Bowman, Austin, TX (US); Jimmy Doyle Pike, Georgetown, TX (US); William Price Dawkins, Lakeway, TX (US); Shyamkumar T. Iyer, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/094,217

(22) Filed: Nov. 10, 2020

(65) Prior Publication Data

US 2021/0056062 A1   Feb. 25, 2021

Related U.S. Application Data

(63) Continuation of application No. 16/396,140, filed on Apr. 26, 2019, now Pat. No. 10,853,293.

(51) Int. Cl.
*G06F 13/40* (2006.01)
*G06F 9/54* (2006.01)
*G06F 13/16* (2006.01)
*G06F 16/22* (2019.01)

(52) U.S. Cl.
CPC .......... *G06F 13/4022* (2013.01); *G06F 9/546* (2013.01); *G06F 13/1668* (2013.01); *G06F 16/2282* (2019.01)

(58) Field of Classification Search
CPC ................................. G06F 21/62; G06F 21/60
See application file for complete search history.

(56) References Cited

U.S. PATENT DOCUMENTS

| | | |
|---|---|---|
| 2002/0184348 A1 | 12/2002 | Rapp et al. |
| 2008/0126507 A1 | 5/2008 | Wilkinson |
| 2010/0318488 A1 | 12/2010 | Oliver et al. |
| 2011/0153908 A1 | 6/2011 | Schaefer et al. |
| 2017/0161520 A1 | 6/2017 | Lockhart et al. |

(Continued)

OTHER PUBLICATIONS

"Pointer (Computer Programming)—Wikipedia, The Free Encyclopedia," Mar. 31, 2019, 22 Pages, Wikimedia Foundation, Inc., https://en.wikipedia.org/wiki/Pointer_(computer_programming).

*Primary Examiner* — Getente A Yimer
(74) *Attorney, Agent, or Firm* — Joseph Mencher

(57) ABSTRACT

A switch-based inter-device notational data movement system includes a switch device that is coupled to a first processing system included in a first chassis and configured to provide a first thread, a second processing system included in a second chassis and configured to provide a second thread, and a memory system. The switch device identifies, in a communication transmitted by the first thread, a request to transfer data, which is stored in a first portion of the memory system that is associated with the first thread in a memory fabric management database, to the second thread. The switch device then modifies notational reference information in the memory fabric management database to disassociate the first portion of the memory system and the first thread and associate the first portion of the memory system with the second thread, which allows the second thread to reference the data using request/respond operation.

20 Claims, 14 Drawing Sheets

(56) References Cited

U.S. PATENT DOCUMENTS

2018/0307859 A1 10/2018 LaFever et al.
2019/0026226 A1 1/2019 Boyd et al.
2019/0266355 A1 8/2019 Lockhart et al.

SWITCH-BASED INTER-DEVICE NOTATIONAL DATA MOVEMENT SYSTEM

CROSS-REFERENCE TO RELATED APPLICATIONS

This application is a continuation of U.S. patent application Ser. No. 16/396,140, filed on Apr. 26, 2019, the disclosure of which is incorporated by reference herein in its entirety.

BACKGROUND

The present disclosure relates generally to information handling systems, and more particularly to the movement of data between information handling systems via notational techniques performed by a switch/bridge device.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, often operate to provide for the movement of data. For example, processor systems included in respective server devices may operate to provide respective virtual machines and/or other applications, and those virtual machines in the different server devices may include threads that transfer data to each other. The transfer of data between threads included on virtual machines provided by different server devices is relatively slow, consumes memory bandwidth, and/or introduces other data transfer inefficiencies known in the art.

Furthermore, traditional processing system/memory system combinations built on the paradigm that the processing system/memory system pair is "fast" and the networking system and storage system is "slow" are being rethought as networking system and storage system speeds catch up to the processing system/memory system pair. For example, memory fabrics such as, for example, Gen-Z memory fabrics, have been introduced to eliminate bottlenecks and increase efficiency in conventional systems via the unification of communication paths and simplification of software required for processing system/memory system communications. As would be understood by one of skill in the art in possession of the present disclosure, such memory fabrics extend the processing system/memory system byte-addressable load/store model to the entire system by decoupling the processing system/compute functionality from the memory system/media functionality, allowing processing systems and memory system to act as peers that communicate using the same language via simplified, high performance, low latency communication paths that do not incur the translation penalties and software overhead in conventional systems.

However, the inventors of the present disclosure have found that data transfer between threads included on virtual machines provided by different server devices and via such memory fabrics still suffer from inefficiencies. For example, a data transfer from a first thread included on a first virtual machine provided by a first server device to a second thread included in a second virtual machine provided by a second server device may include the first thread generating and transmitting a memory load instruction to a memory fabric requester associated with the processing system that provides the first virtual machine. In response to receiving that memory load instruction, the memory fabric requester will then transmit a memory fabric request to a memory fabric responder associated with the memory system. The memory fabric responder will then retrieve data that is being requested in the memory fabric request from the memory device(s) in the memory system, and transmit that data as a payload in a memory fabric response to the memory fabric requester. The memory fabric requester will then load the data in the memory fabric response into a first memory system utilized by the first processing system that provides the first virtual machine, which allows the first thread to transmit that data to the second thread. As such, data movement between threads included on virtual machines provided by different server devices and via a memory fabric requires several read/copy, transmit, and write operations that the inventors of the present disclosure have discovered are unnecessary.

Accordingly, it would be desirable to provide an improved inter-device data movement system

SUMMARY

According to one embodiment, an Information Handling System (IHS) includes a processing system; and a memory system that is coupled to the processing system and that includes instructions that, when executed by the processing system, cause the processing system to provide a switch memory fabric management engine that is configured to: identify, in a communication transmitted by a first thread that is provided by a first processing system that is included in a first chassis, a request to transfer data to a second thread that is provided by a second processing system that is included in a second chassis, wherein the data is stored in a first portion of a memory system that is coupled to the switch memory fabric management engine and that is associated with the first thread in a memory fabric management database; and modify, in the memory fabric management database, notational reference information in order to disassociate the first portion of the memory system and the first thread and associate the first portion of the memory system with the second thread, wherein the association of the first portion of the memory system with the second thread allows the second thread to reference the data using request/respond operation.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
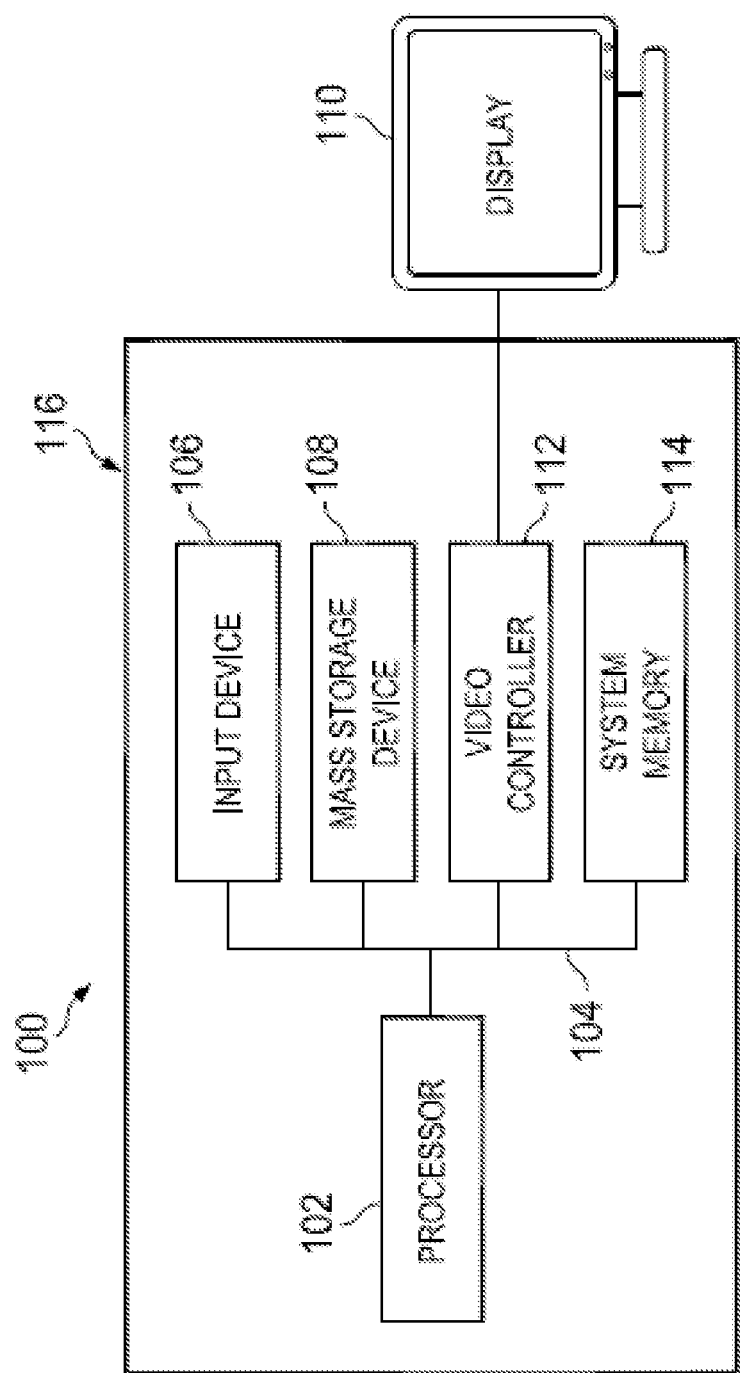
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
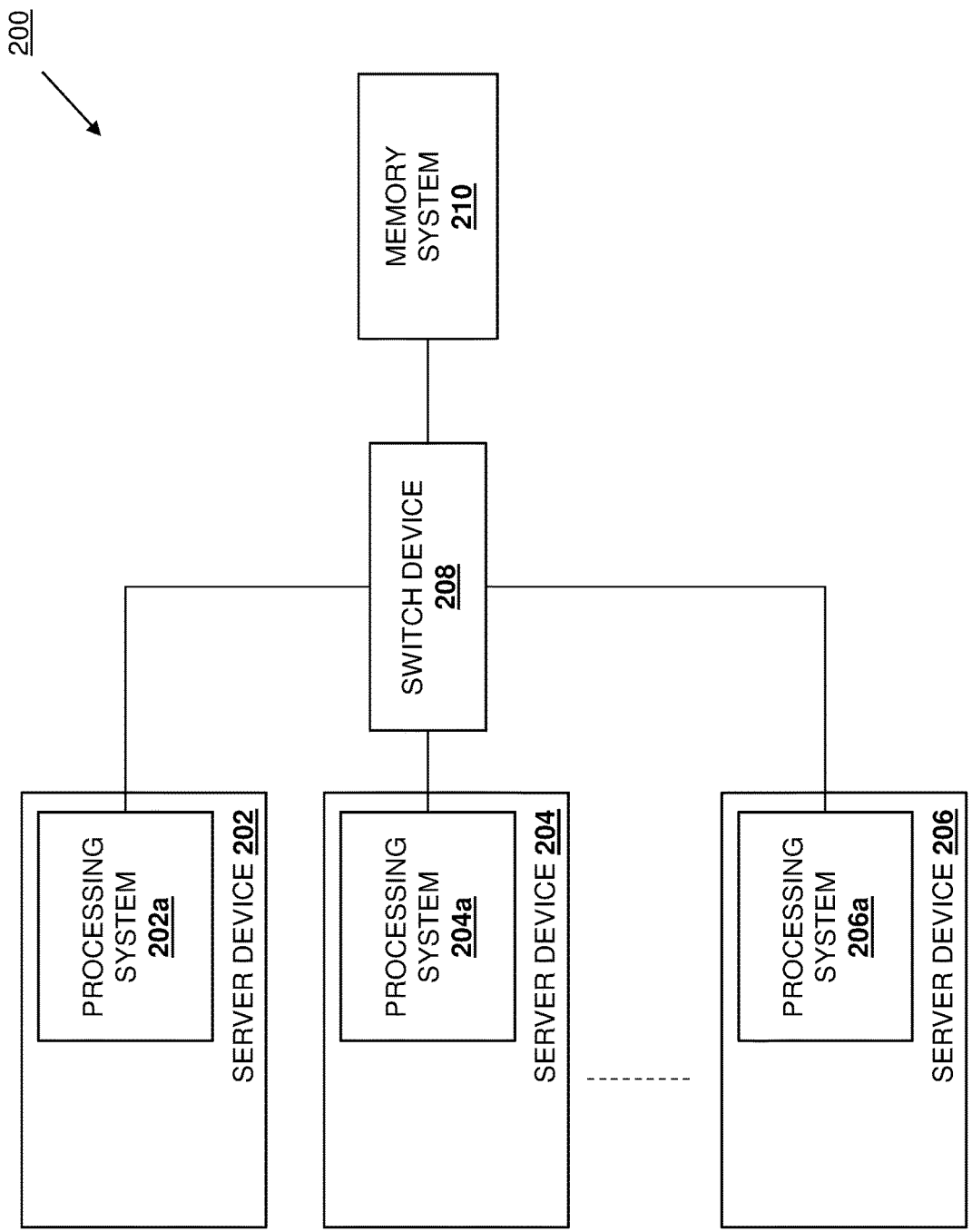
FIG. 2 is a schematic view illustrating an embodiment of a networked system.

Referring now to FIG. 2, an embodiment of a networked system 200 is illustrated. In the illustrated embodiment, the networked system 200 incudes a plurality of server devices 202, 204, and up to 206. In an embodiment, any or all of the server devices 202, 204, and 206 may be provided by the IHS 100 discussed above with reference to FIG. 1, and/or may include some or all of the components of the IHS 100. However, while illustrated and discussed as server devices, one of skill in the art in possession of the present disclosure will recognize that the server devices 202, 204, and 206 provided in the networked system 200 may include any devices that may be configured to operate similarly as discussed below. While only three server devices 202, 204, and 206 are illustrated and discussed below, one of skill in the art in possession of the present disclosure will recognize that many more server devices may (and typically will) be provided in the networked system 200 (e.g., a datacenter) while remaining within the scope of the present disclosure. In the illustrated embodiment, each of the server devices 202, 204, and 206 includes a respective processing system 202a, 204a, and up to 206a. While not illustrated, each of the processing system 202a, 204a, and up to 206a may be coupled to respective local memory systems that are provided in their respective server devices 202, 204, and 206, and that include instructions that, when executed by the respective processing systems 202a, 204a, and up to 206a, allow the processing systems 202a, 204a, and up to 206a to perform any of the functionality discussed below (e.g., the provisioning of virtual machines, applications, threads, etc.)

In the Illustrated embodiment, the server devices 202, 204, and 206 are each coupled to a switch device 208 (e.g., via a network that may be provided in the networked system 200 by, for example, a Local Area Network (LAN), the Internet, and/or any other network (or combination of networks) that would be apparent to one of skill in the art in possession of the present disclosure.) In an embodiment, the switch device 208 may be provided by the IHS 100 discussed above with reference to FIG. 1, and/or may include some or all of the components of the IHS 100. In a specific example, the switch device 208 may be provided by a Gen-Z switch device that has been configured to provide the inter-device notational data movement functionality discussed below. While discussed herein as being a switch device, one of skill in the art in possession of the present disclosure will recognize that the switch device 208 may be replaced with a bridge device and/or other devices with similar functionality while remaining within the scope of the present disclosure as well. Furthermore, the illustrated embodiment of the networked system 200 includes a memory system 210 that is coupled to the server devices 202, 204, and 206 via the switch device 208. In an embodiment, the memory system 210 may be provided by the IHS 100 discussed above with reference to FIG. 1, and/or may include some or all of the components of the IHS 100. In specific examples, the memory system 210 may be provided by one or more separate server devices, as a logical portion of one or more of the server devices 202, 204, and 206, and/or in a variety of other manners that would be apparent to one of skill in the art in possession of the present disclosure. In the embodiments discussed below, the memory system 210 provides a network-connected memory fabric that may be utilized by any of the server devices 202, 204, and 206 via the switch device 208.

For example, the network-connected memory fabric may be a Gen-Z memory fabric created and commercialized by the Gen-Z consortium, and which one of skill in the art in possession of the present disclosure will recognize extends the processing system/memory system byte-addressable load/store model to the entire networked system 200 by decoupling the processing system/compute functionality in the server devices 202, 204, and 206 from the memory system/media functionality in the memory system 210, allowing processing systems and memory system to act as peers that communicate using the same language via simplified, high performance, low latency communication paths that do not incur the translation penalties and software overhead in conventional systems, thus eliminating bottlenecks and increasing efficiency via the unification of communication paths and simplification of software required for processing system/memory system communications. However, one of skill in the art in possession of the present disclosure will recognize that other types of memory fabrics will fall within the scope of the present disclosure as well. Furthermore, the server devices 202, 204, and 206 are illustrated as each coupled to the memory system 210 via the switch device 208, one of skill in the art in possession of the present disclosure will recognize that in other embodiments the switch device 208 and the memory system 210 may be provided in a server device to enable the functionality described below while remaining within the scope of the present disclosure as well. As such, while a specific networked system 200 has been illustrated and described, one of skill in the art in possession of the present disclosure will recognize that the inter-device notational data movement system of the present disclosure may utilize a variety of other components and component configurations while remaining within the scope of the present disclosure as well.

Figure 3:
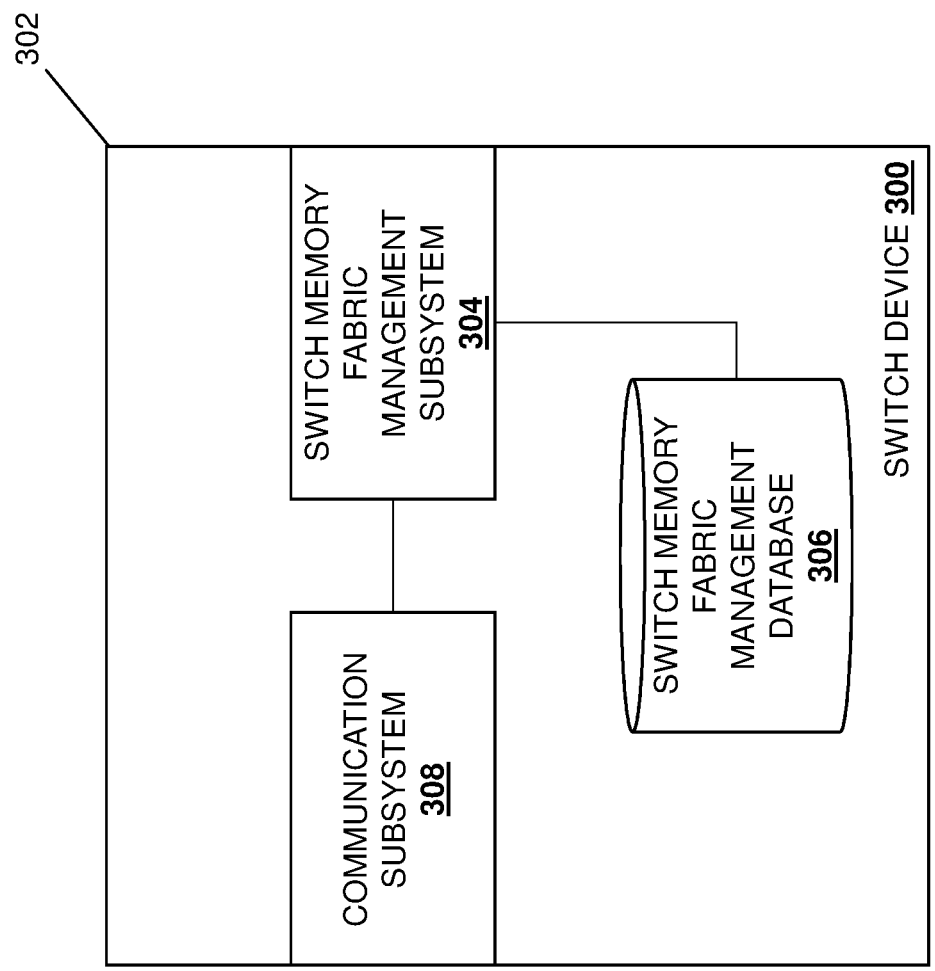
FIG. 3 is a schematic view illustrating an embodiment of a switch device that may be included in the networked system of FIG. 2 and that may provide the switch-based inter-device notational data movement system of the present disclosure.

Referring now to FIG. 3, an embodiment of a switch device 300 is illustrated that may provide the switch device 208 discussed above with reference to FIG. 2. As such, the switch device 300 may be provided by the IHS 100 discussed above with reference to FIG. 1 and/or may include some or all of the components of the IHS 100, and in specific examples may be provided by a Gen-Z switch device as discussed above. Furthermore, while illustrated and described as a switch device 300, one of skill in the art in possession of the present disclosure will recognize that the functionality of the switch device 300 discussed below may be provided by other devices (e.g., the bridge devices discussed above) that are configured to operate in a similar manner. In the illustrated embodiment, the switch device 300 includes a chassis 302 that houses the components of the switch device 300, only some of which are illustrated below. In the illustrated embodiment, the chassis 302 houses a memory fabric management subsystem 304 that is configured to provide memory fabric management operations for the switch device 300.

For example, when the memory fabric is a Gen-Z memory fabric as discussed above, the memory fabric management subsystem 304 may include a Gen-Z Memory Management Unit (Gen-Z ZMMU) that, in the example provided below, operates to enable access for the processing systems 202a, 204a, and 206a of FIG. 2 to the Gen-Z memory fabric by augmenting the Gen-Z ZMMU requester operations, and may operate to manage all the Gen-Z ZMMUs in the system. In some specific examples, the switch device 300 may operate to hide the hierarchy of Gen-Z ZMMUs behind it by, for example, operating as a Gen-Z ZMMU requester and a Gen-Z ZMMU responder. As such, when the Gen-Z ZMMU(s) provided by the switch device 300 have been programmed, each server device 202, 204, and 206 may discover Gen-Z memory fabric access (e.g., via a Gen-Z aperture) during the boot process, and map ZMMU memory space aperture(s) into their system physical address space, and the BIOS, firmware, and operating system in each of those server devices may perform the ZMMU address space discovery. Following that discovery, the operating system may implement a memory manager using a CPU MMU in order to allocate memory using MMU page size chunks for applications (i.e., the ZMMU aperture may be allocated by the memory fabric management subsystem 304, with the individual MMU pages allocated to the application(s) by server device operating systems). However, one of skill in the art in possession of the present disclosure will recognize that other memory fabric management subsystems for other memory fabrics may be utilized with the teachings of the present disclosure while remaining within its scope as well.

The chassis 302 may also house a storage system (not illustrated, but which may include the storage 108 discussed above with reference to FIG. 1) that is coupled to the memory fabric management subsystem 304 (e.g., via a coupling between the storage system and the memory fabric management subsystem 304) and that includes a memory fabric management database 306 that is configured to store any of the information (e.g., the memory fabric reference pointers, memory fabric page ownership information, etc.) utilized by the memory fabric management subsystem 304 discussed below. In the illustrated embodiment, the chassis 302 also houses a communication subsystem 308 that is coupled to the memory fabric management subsystem 304 and that may be provided by a Network Interface Controller (NIC), wireless communication components (e.g., Wifi components, BLUETOOTH components, Near Field Communication (NFC) components, etc.), and/or any other communication subsystems that would be apparent to one of skill in the art in possession of the present disclosure. While a specific switch device 300 has been illustrated, one of skill in the art in possession of the present disclosure will recognize that switch devices (or other devices operating according to the teachings of the present disclosure in a manner similar to that described below for the switch device 300) may include a variety of components and/or component configurations for providing conventional switch device functionality, as well as the functionality discussed below, while remaining within the scope of the present disclosure as well.

Figure 4:
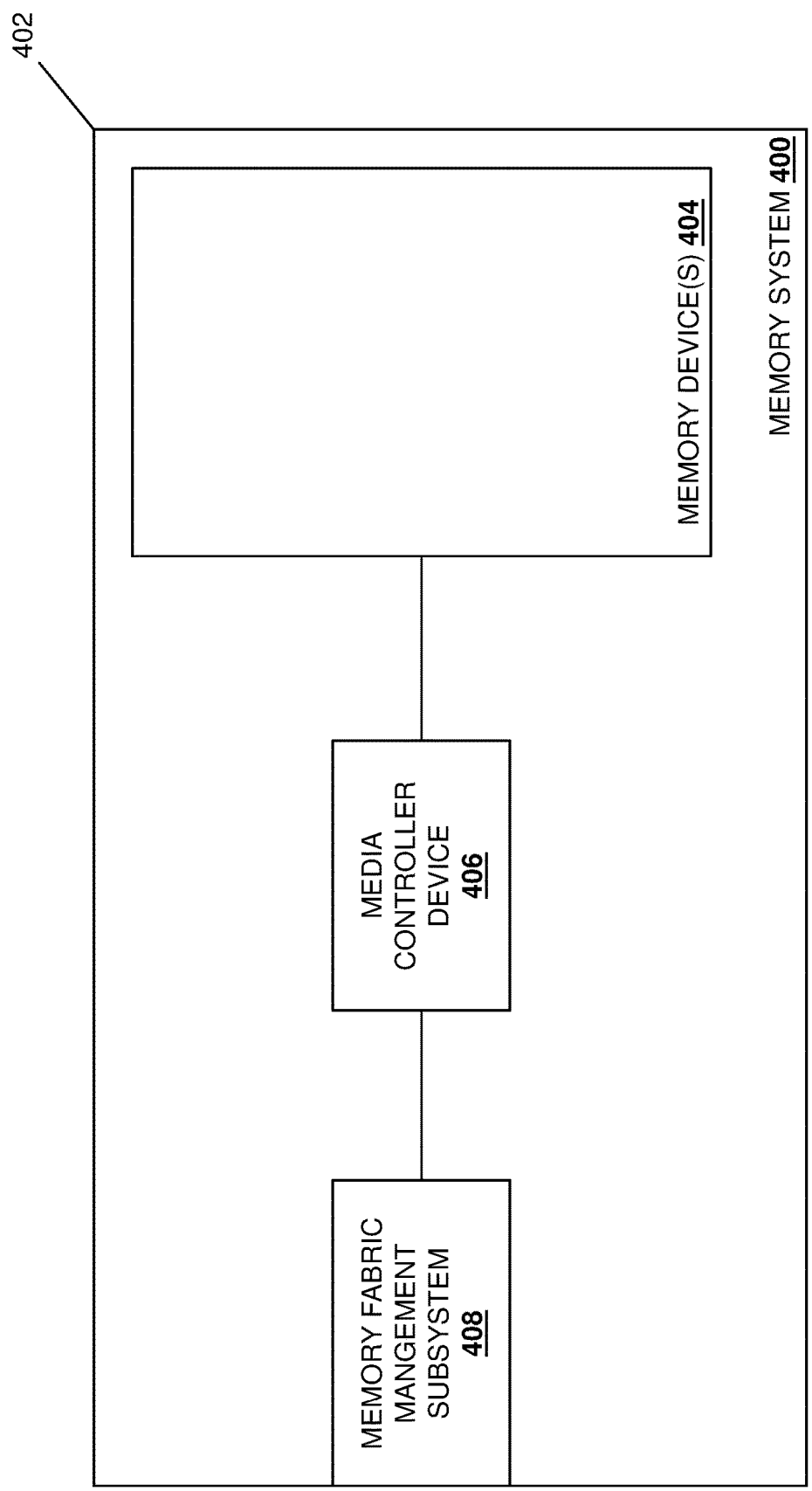
FIG. 4 is a schematic view illustrating an embodiment of a memory system that may be included in the networked system of FIG. 2.

Referring now to FIG. 4, an embodiment of a memory system 400 is illustrated that may provide memory system 210 discussed above with reference to FIG. 2. As such, the memory system may be provided by the IHS 100 discussed above with reference to FIG. 1 and/or may include some or all of the components of the IHS 100, and in specific examples may be provided by one or more separate server devices, one or more of the server devices 202, 204, and 206, and/or in a variety of other manners that would be apparent to one of skill in the art in possession of the present disclosure. Furthermore, while illustrated and discussed as a memory system, one of skill in the art in possession of the present disclosure will recognize that the functionality of the memory system discussed below may be provided by other devices that are configured to operate similarly as discussed below. In the illustrated embodiment, the memory system 400 includes a chassis 402 that houses the components of the memory system 400, only some of which are illustrated below.

For example, the chassis 402 may house one or more memory devices 404 that may be provided by Dynamic Random Access Memory (DRAM) devices, Storage Class Memory (SCM) devices, Solid State Drive (SSD) device arrays, and/or any other memory device that would be apparent to one of skill in the art in possession of the present disclosure. In the illustrated embodiment, the chassis 402 houses a media controller device 406 that is coupled to the memory device(s) 404. While illustrated as a single medial controller device 406 coupled to one or more memory device(s) 404, one of skill in the art in possession of the present disclosure will recognize that multiple media controller devices may be provided for the memory device(s) 404 while remaining within the scope of the present disclosure as well. For example, a separate media controller device may be provided for each memory device technology (e.g., a first media controller device may be provided for DRAM devices, a second media controller device may be provided for SCM devices, etc.) However, while a few specific examples of memory devices and media controller devices have been provided, one of skill in the art in possession of the present disclosure will recognize that a wide variety of memory device and/or media controller device components and/or configurations will fall within the scope of the present disclosure as well.

In the illustrated embodiment, the chassis 402 houses a memory fabric management subsystem 408 that is configured to provide memory fabric management operations for the memory system 400. For example, when the memory fabric is a Gen-Z memory fabric as discussed above, the memory fabric management subsystem 408 may include a Gen-Z Memory Management Unit (Gen-Z ZMMU) that, in the example provided below, operates as a Gen-Z ZMMU responder that operates with Gen-Z ZMMU requester(s) that provide access for the processing systems 202a, 204a, and 206a to the Gen-Z memory fabric. However, one of skill in the art in possession of the present disclosure will recognize that other memory fabric management subsystems for other memory fabrics may be utilized with the teachings of the present disclosure while remaining within its scope as well. While a specific memory system 400 has been illustrated, one of skill in the art in possession of the present disclosure will recognize that memory systems (or other systems operating according to the teachings of the present disclosure in a manner similar to that described below for the memory system 400) may include a variety of components and/or component configurations for providing conventional memory system functionality, as well as the functionality discussed below, while remaining within the scope of the present disclosure as well.

Figure 5:
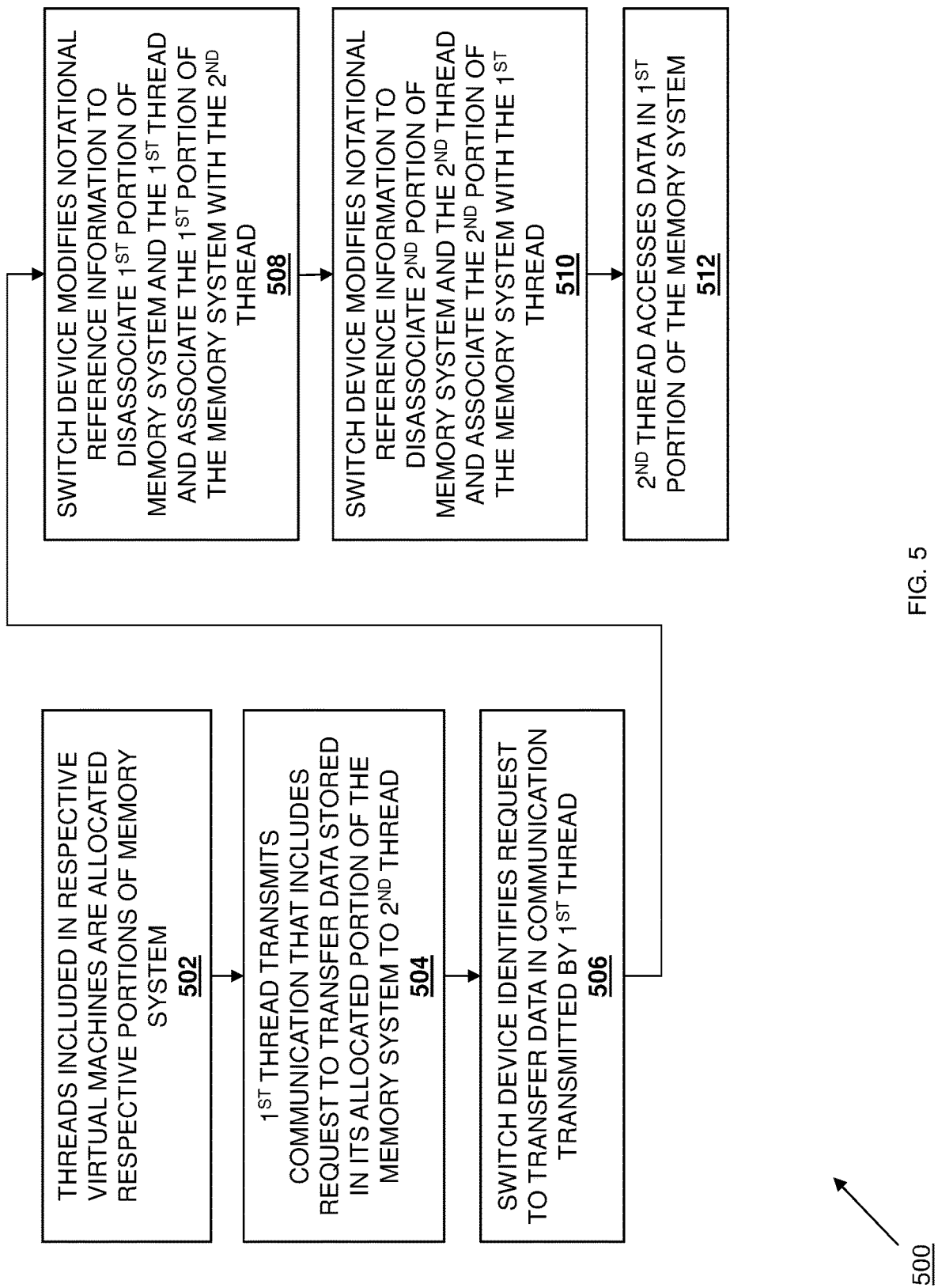
FIG. 5 is a flow chart illustrating an embodiment of a method for providing switch-based inter-device notational data movement.

Referring now to FIG. 5, an embodiment of a method for providing inter-device notational data movement is illustrated. As discussed below, the systems and methods of the present disclosure provide for the "transfer" of data while avoiding the need to perform read, write, copy, and/or other conventional data transfer operations that actually move data between memory fabric address spaces by changing the allocations of portions of a memory system in a memory fabric between a thread that requests to transfer that data and a thread to which the transfer of that data was requested. For example, a first thread included in a first virtual machine provided by a first processing system in a first server device may request to transfer data to a second thread included in a second virtual machine provided by a second processing system in a second server device, and a switch device provided between those threads and a memory fabric memory system may identify that request to transfer data. In response, the switch device modifies notational reference information in a database in order to disassociate the first portion of the memory fabric memory system and the first thread and associate the first portion of the memory fabric memory system with the second thread, which allows the second thread to reference that data in the memory fabric memory system using request/respond operations. As such, more efficient inter-device memory-fabric-based data transfers are provided that eliminate the need to perform conventional data transfer operations that actually move the data between memory fabric address spaces, while providing the effect of such data movement via the modification of notational reference information in order to reallocate portions of the memory fabric.

Figure 6A:
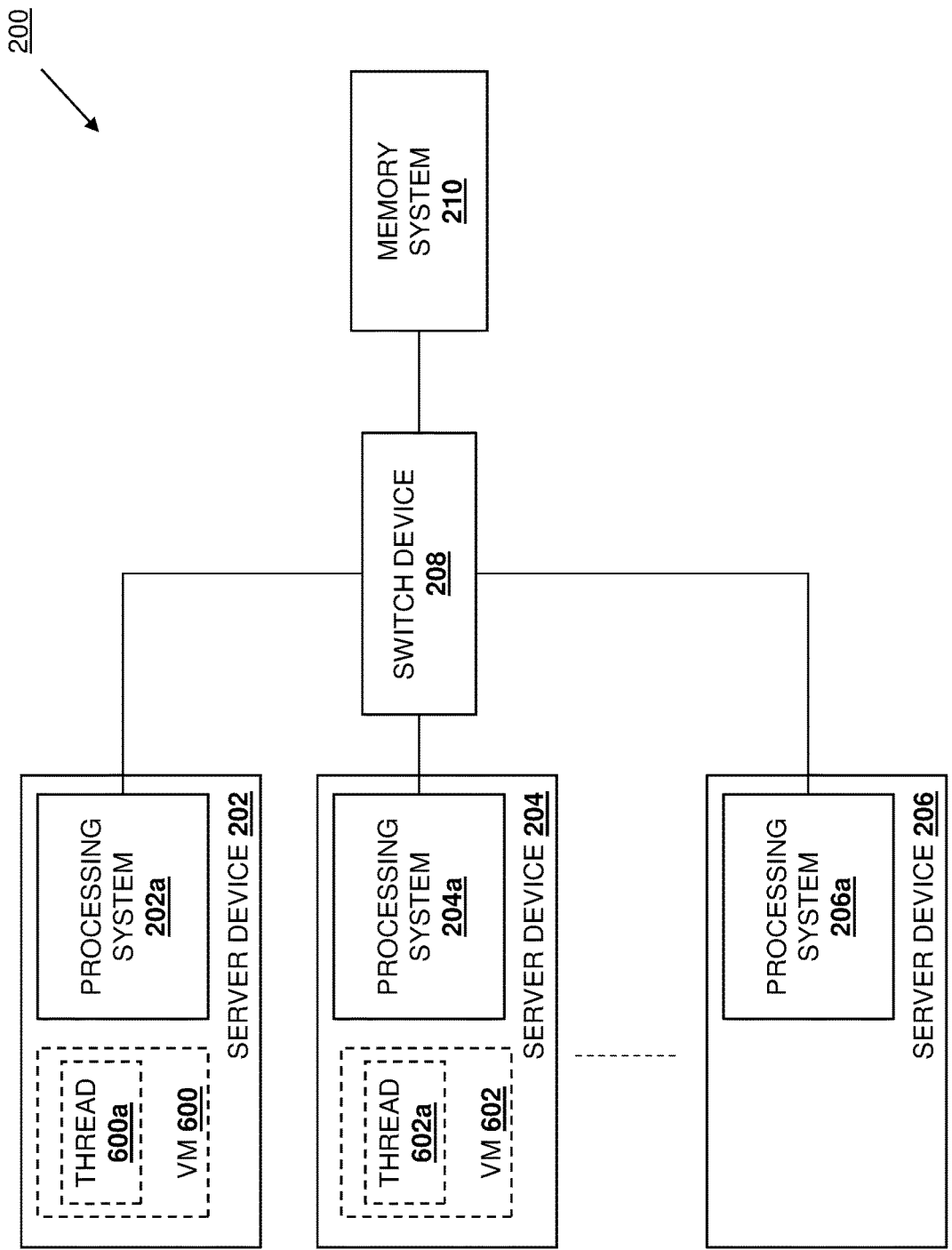
FIG. 6A is a schematic view illustrating an embodiment of server devices in the networked system of FIG. 2 operating during the method of FIG. 5.

The method 500 begins at block 502 where threads included in respective virtual machines are allocated respective portions of a memory system in a memory fabric. In an embodiment, at block 502, any or all of the processing systems 202a, 204a, and/or 206a in their respective server devices 202, 204, and/or 206 may operate to provide a virtual machine or other application (e.g., via the execution of instructions on a local memory system to which they are connected), and as would be understood by one of skill in the art in possession of the present disclosure, those virtual machines/applications may include threads or other virtual machine/application components that are configured to utilize portions of a memory fabric memory system similarly as discussed below. With reference to FIG. 6A and for the purposes of the examples provided below, the processing system 202a in the server device 202 is illustrated as providing a Virtual Machine (VM) 600 (e.g., via the execution of instructions included on a local memory system) that includes a thread 600a, and the processing system 204a in the server device 204 is illustrated as providing a Virtual Machine (VM) 602 (e.g., via the execution of instructions included on a local memory system) that includes a thread 602a. However, while two virtual machines including respective threads are illustrated, one of skill in the art in possession of the present disclosure will recognize that any number of virtual machines and their threads may be provided while remaining within the scope of the present disclosure as well.

In an embodiment, at block 502, any or all of the virtual machines, applications, threads, and/or other virtual machine/application components may be allocated portions of a memory system in a memory fabric. For example, the switch memory fabric management subsystem 304 in the switch device 300 may operate to allocate different portions of the memory system 210/400 to the threads 600*a* and 602*a* by, for example, communicating with the memory fabric management subsystem 408 in the memory system 210/400 via its communication subsystem 308 in order to cause the media controller device 406 to provide allocations of memory system address space included in the memory device(s) 404 to the threads 600*a* and 602*a*

In a specific example, Gen-Z ZMMUs may provide Gen-Z apertures for pages in the memory fabric that operate essentially as a page directory for the memory fabric that is managed/programmed by the memory fabric manager and advertised using the Gen-Z apertures, specific memory fabric resources, and memory regions. Furthermore, once mapped and advertised to a server device, the server device may discover the memory as part of its normal boot memory discovery process (e.g., using firmware and via an e820/ACPI table map) and provide its address region in the server devices physical address space map, which allows that memory to be discovered by its operating system. The operating system memory manager will then allocate one or more virtual machine threads from various regions within the system physical address space, including the spaces discovered via the Gen-Z ZMMU apertures.

Furthermore, the switch memory fabric management subsystem 304 in the switch device 300 may store notational reference information about memory system portion allocations in the switch memory fabric management database 306, which may include, for example, reference pointers that map the first thread to a first portion of the memory system 210/400 and that map the second thread to a second portion of the memory system 210/400, page ownership information that provides the first thread ownership of the first portion of the memory system 210/400 and that provides the second thread ownership of the second portion of the memory system 210/400, and/or any other notational reference information that would be recognized by one of skill in the art in possession of the present disclosure as providing for the allocation of portions of a memory fabric memory system to threads.

Figure 6B:
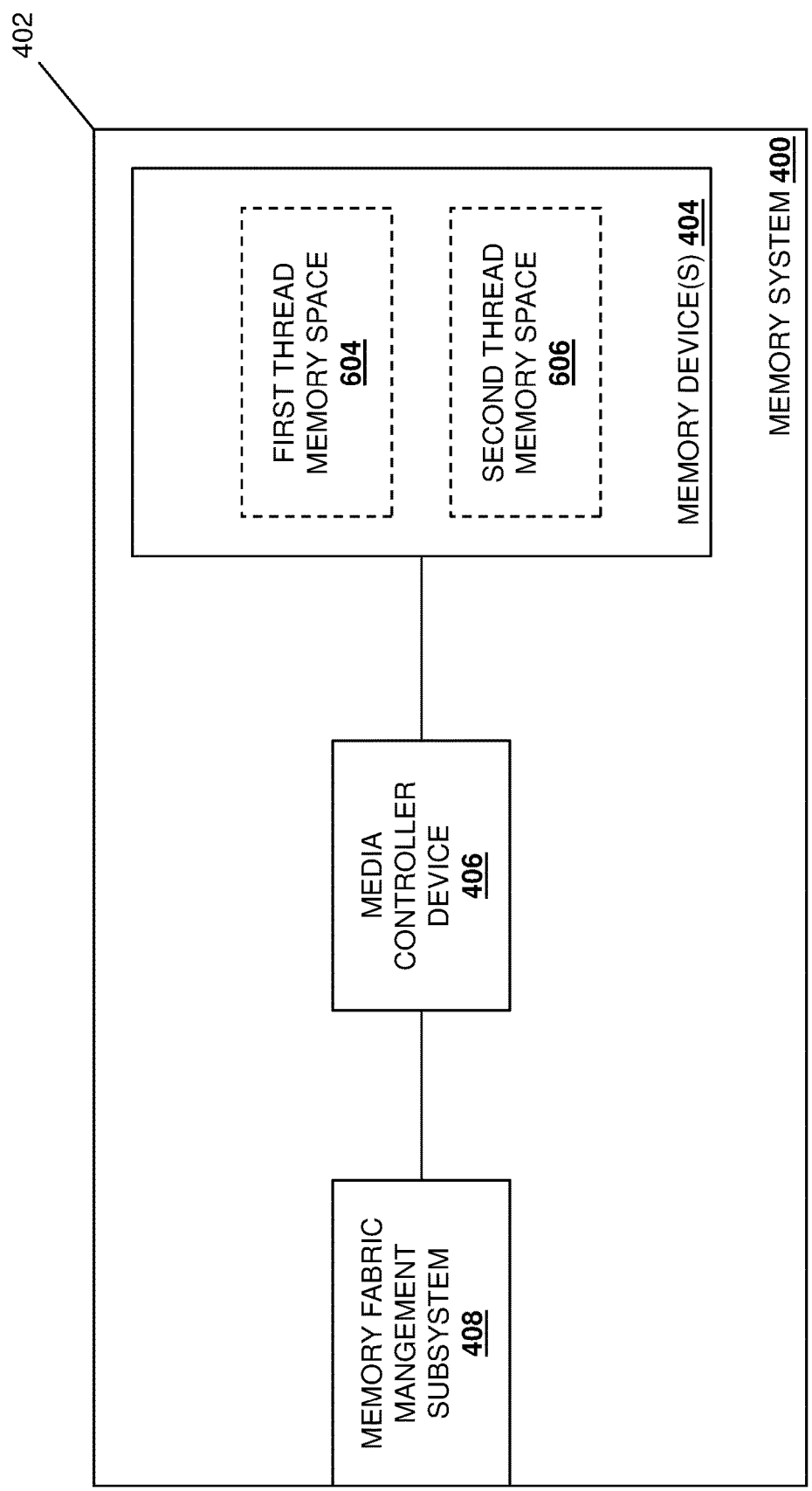
FIG. 6B is a schematic view illustrating an embodiment of the memory system of FIG. 4 operating during the method of FIG. 5.

With reference to FIG. 6B and for the purposes of the examples provided below, the thread 600*a* is illustrated as having been allocated a first thread memory space 604 (e.g., by the media controller device 406 in response to the communications between the switch memory fabric management subsystem 304 and the memory fabric management subsystems 408 as discussed above), and the thread 602*a* is illustrated as having been allocated a second thread memory space 606 (e.g., by the media controller device 406 in response to the communications between the switch memory fabric management subsystem 304 and the memory fabric management subsystems 408 as discussed above). As would be appreciated by one of skill in the art in possession of the present disclosure, the first thread memory space 604 and the second thread memory space 606 may be defined by different memory address ranges provided by the memory device(s) 404, different memory pages provided by the memory device(s) 404, and/or other different portions of the memory device(s) 404 that would be apparent to one of skill in the art in possession of the present disclosure. In the examples below, the first thread memory space 604 and the second thread memory space 606 are equal size memory spaces, but one of skill in the art in possession of the present disclosure will recognize that threads may be allocated different size memory spaces, and the discussion of equal size memory spaces below applies to particular embodiments of the present disclosure. In particular, the portion of the memory system 400 allocated to the thread 602*a* may be larger than the second thread memory space 606, with the second memory thread space 606 providing a subset of that portion of the memory system 400 allocated to the thread 602*a* that stores the data being "transferred" during the method 500.

Figure 7:
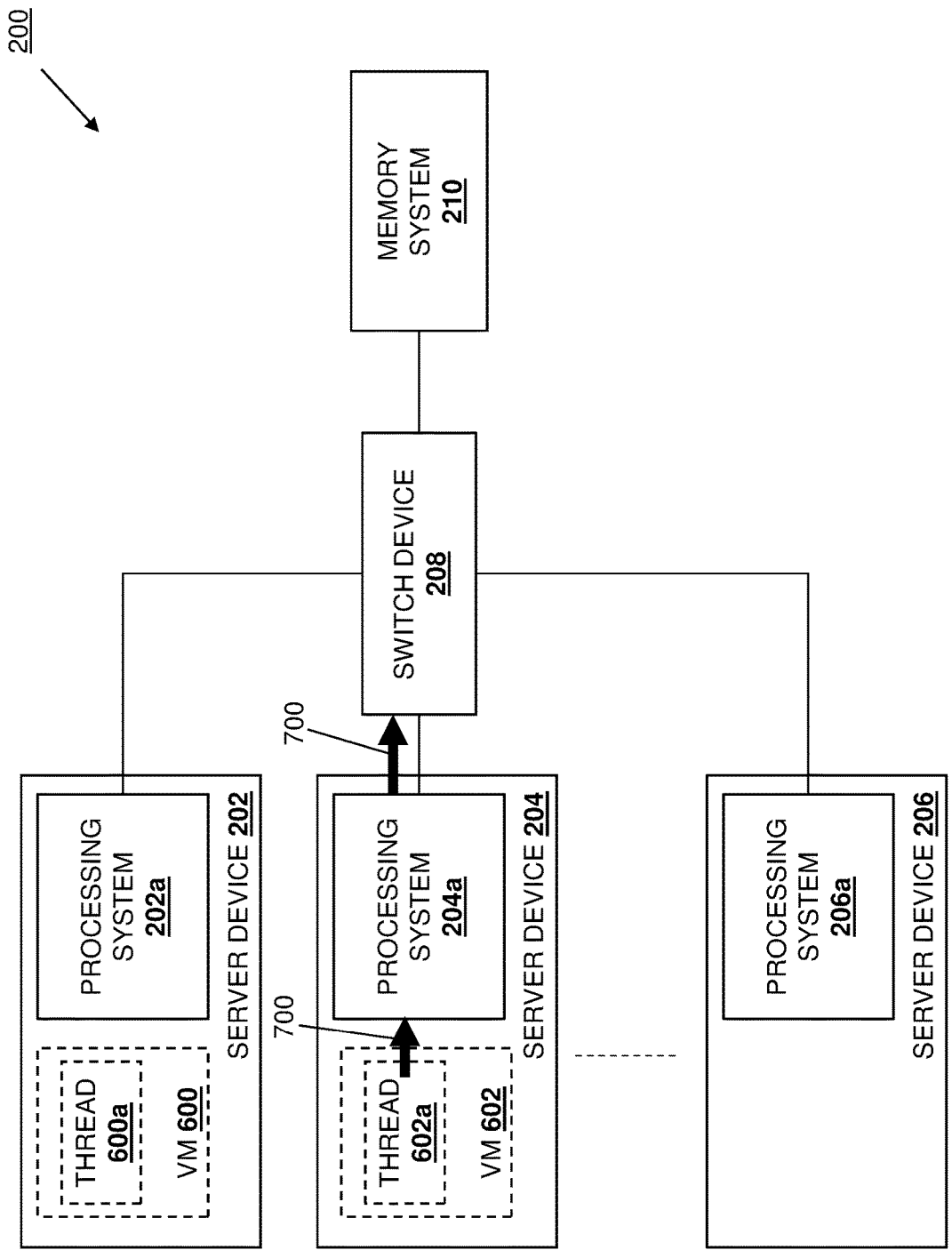
FIG. 7 is a schematic view illustrating an embodiment of the server devices in the networked system of FIG. 2 operating during the method of FIG. 5.

The method 500 then proceeds to block 504 where a first thread transmits a communication that includes a request to transfer data stored in its allocated portion of the memory system to a second thread. In an embodiment, at or before block 504, any thread included in a virtual machine provided by a processing system in a server device 202, 204, and/or 206 may request a data transfer to another thread included in another virtual machine provided by a processing system in another server device. One of skill in the art in possession of the present disclosure will recognize that a wide variety of scenarios may call for the transfer of data between threads included in virtual machines provided by processing system(s) in different server devices, and data transfer requests resulting from any of those scenarios are envisioned as falling within the scope of the present disclosure. Continuing the example above and with reference to FIG. 7, the thread 602*a* is illustrated as transmitting a request 700 to transfer data via the processing system 204*a* in the server device 204, with the switch device 208 having access to that request 700. In an embodiment, the request to transfer data provided by the first thread at block 504 may be provided in an Inter-Process Communication (IPC) that includes a reference-only data descriptor transfer message that identifies the second thread and, as would be understood by one of skill in the art in possession of the present disclosure, does not include the data to-be transferred but rather includes references to the location of that data in the memory fabric memory system. For example, the request 700 to transfer data provided by the thread 602*a* at block 504 may include an IPC that identifies the thread 600*a* and does not include the data to-be transferred, but rather includes references to the second thread memory space 606 in the memory device(s) 404 that store that data in the memory system 400.

The method 500 then proceeds to block 506 where a switch device identifies the request to transfer data in the communication transmitted by the first thread. In an embodiment, at block 506, the switch device 208 may operate to identify requests to transfer data transmitted by any thread included in any virtual machine provided by any of the processing systems 202*a*, 204*a*, and 206*a* included in their respective server devices 202, 204, and 206. Continuing with the example provided above and with reference to FIG. 7, the communication subsystem 308 in the switch device 300 may receive the request 700, and the switch memory fabric management subsystem 304 may operate to identify the request 700 to transfer data that was transmitted by the thread 602*a*. In some embodiments, the switch memory fabric management subsystem 304 may be configured to snoop communications transmitted by any thread included in any virtual machine provided by any of the processing systems 202*a*, 204*a*, and 206*a* included in their respective server devices 202, 204, and 206 in order to identify requests to transfer data. For example, with reference to FIG. 8, during the process of conventional subsystems in the switch device 300 performing conventional switching operations on the request 700, the switch memory fabric management subsystem 304 may operate to performing snooping operations 800 on the request 700 to transfer data that was transmitted by the thread 602a in order to identify the thread 600a to which the data is to-be transferred, data address(es) for the data to-be transferred, data references for the data to-be transferred, and/or any other data transfer information that would be apparent to one of skill in the art in possession of the present disclosure. However, while a specific example of the identification of requests to transfer data have been described, one of skill in the art in possession of the present disclosure will recognize that requests to transfer data may be identified in a variety of manners that will fall within the scope of the present disclosure as well.

Figure 8:
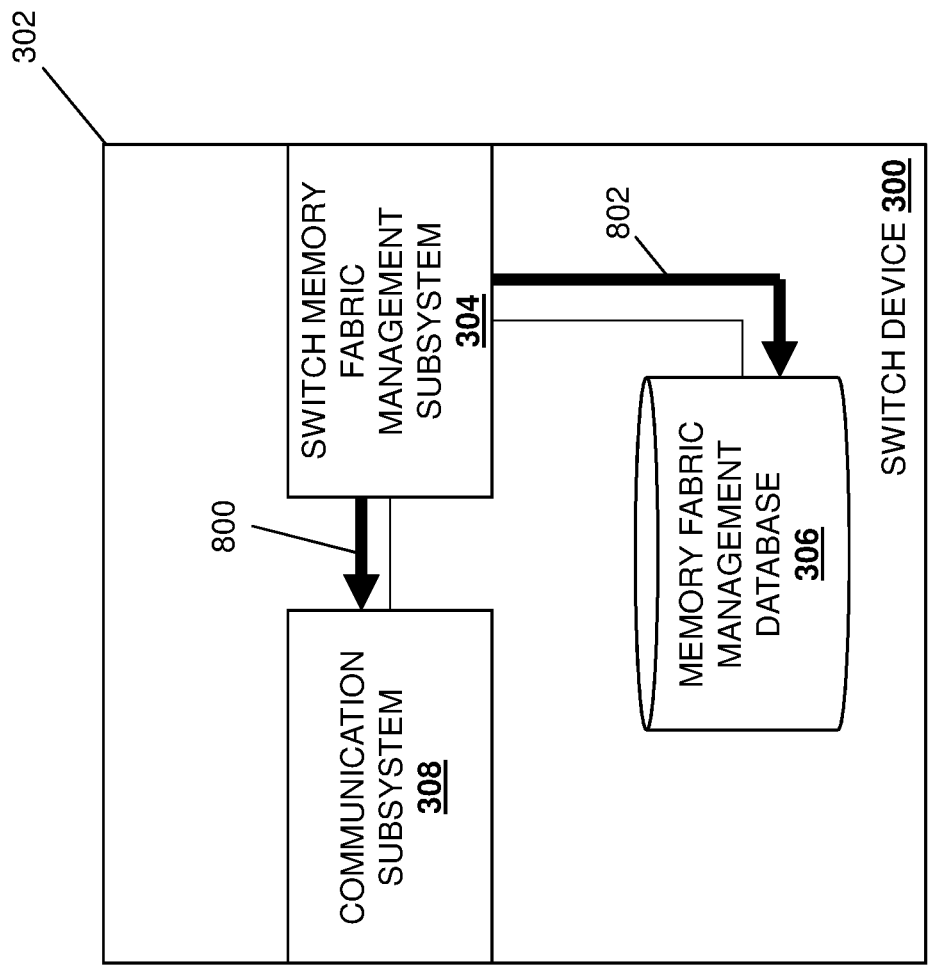
FIG. 8 is a schematic view illustrating an embodiment of the memory system of FIG. 4 operating during the method of FIG. 5.

The method 500 then proceeds to block 508 where the switch device modifies notational reference information to disassociate a first portion of the memory system and the first thread, and associate the first portion of the memory system with the second thread. In an embodiment, at block 508, the switch memory fabric management subsystem 304 in the switch device 300 may operate to access the switch memory fabric management database 306 and perform notational reference information modification operations 802 in the switch memory fabric management database 306, as illustrated in FIG. 8. In an embodiment, the notational reference information modification operations 802 may be performed on the notational reference information that is associated with the memory system portion allocations and that was stored in the switch memory fabric management database 306 at block 502 which, as discussed above, may include reference pointers that map the thread 600a to the first thread memory space 604 in the memory device(s) 404 included in the memory system 210/400 and that map the thread 602a to the second thread memory space 606 in the memory device(s) 404 included in the memory system 210/400, page ownership information that provides the thread 600a ownership of the first thread memory space 604 in the memory device(s) 404 included in the memory system 210/400 and that provides the thread 602a ownership of the second thread memory space 606 in the memory device(s) 404 included in the memory system 210/400, and/or any other notational reference information that would be recognized by one of skill in the art in possession of the present disclosure as providing for the allocation of portions of the memory fabric memory system to threads.

For example, at block 512, the modification of the notational reference information in the switch memory fabric management database 306 may include the switch memory fabric management subsystem 304 in the switch device 300 disassociating the thread 602a from the second thread memory space 606 that it was allocated in the memory device(s) 404 included in the memory system 210/400 at block 502, and associating the thread 600a with the second thread memory space 606 in the memory device(s) 404 included in the memory system 210/400. In a specific example, the disassociation of the thread 602a from the second thread memory space 606 and the association of the thread 600a with the second thread memory space 606 may include changing a reference pointer that maps the thread 602a to the second thread memory space 606 such that that reference pointer maps the thread 600a to the second thread memory space 606, and changing page ownership information that provides the thread 602a ownership of the second thread memory space 606 such that the thread 600a owns the second thread memory space 606. However, while specific notation reference information modification operations have been described, one of skill in the art in possession of the present disclosure will recognize that the second thread memory space 606 may be disassociated with the thread 602a and associated with the thread 600a in a variety of manners that will fall within the scope of the present disclosure as well.

The method 500 proceeds to block 510 where the switch device modifies notational reference information to disassociate a second portion of the memory system and the second thread, and associate the second portion of the memory system with the first thread. In an embodiment, at block 510, the modification of the notational reference information in the switch memory fabric management database 306 may include the switch memory fabric management subsystem 304 in the switch device 300 disassociating the thread 600a from the first thread memory space 604 that it was allocated in the memory device(s) 404 included in the memory system 210/400 at block 502, and associating the thread 602a with the first thread memory space 604 in the memory device(s) 404 included in the memory system 210/400. In a specific example, the disassociation of the thread 600a from the first thread memory space 604 and the association of the thread 602a with the first thread memory space 604 may include changing a reference pointer that maps the thread 600a to the first thread memory space 604 such that that reference pointer maps the thread 602a to the first thread memory space 604, and changing page ownership information that provides the thread 600a ownership of the first thread memory space 604 such that the thread 602a owns the first thread memory space 604. However, while specific notation reference information modification operations have been described, one of skill in the art in possession of the present disclosure will recognize that the first thread memory space 604 may be disassociated with the thread 600a and associated with the thread 602a in a variety of manners that will fall within the scope of the present disclosure as well.

Figure 9:
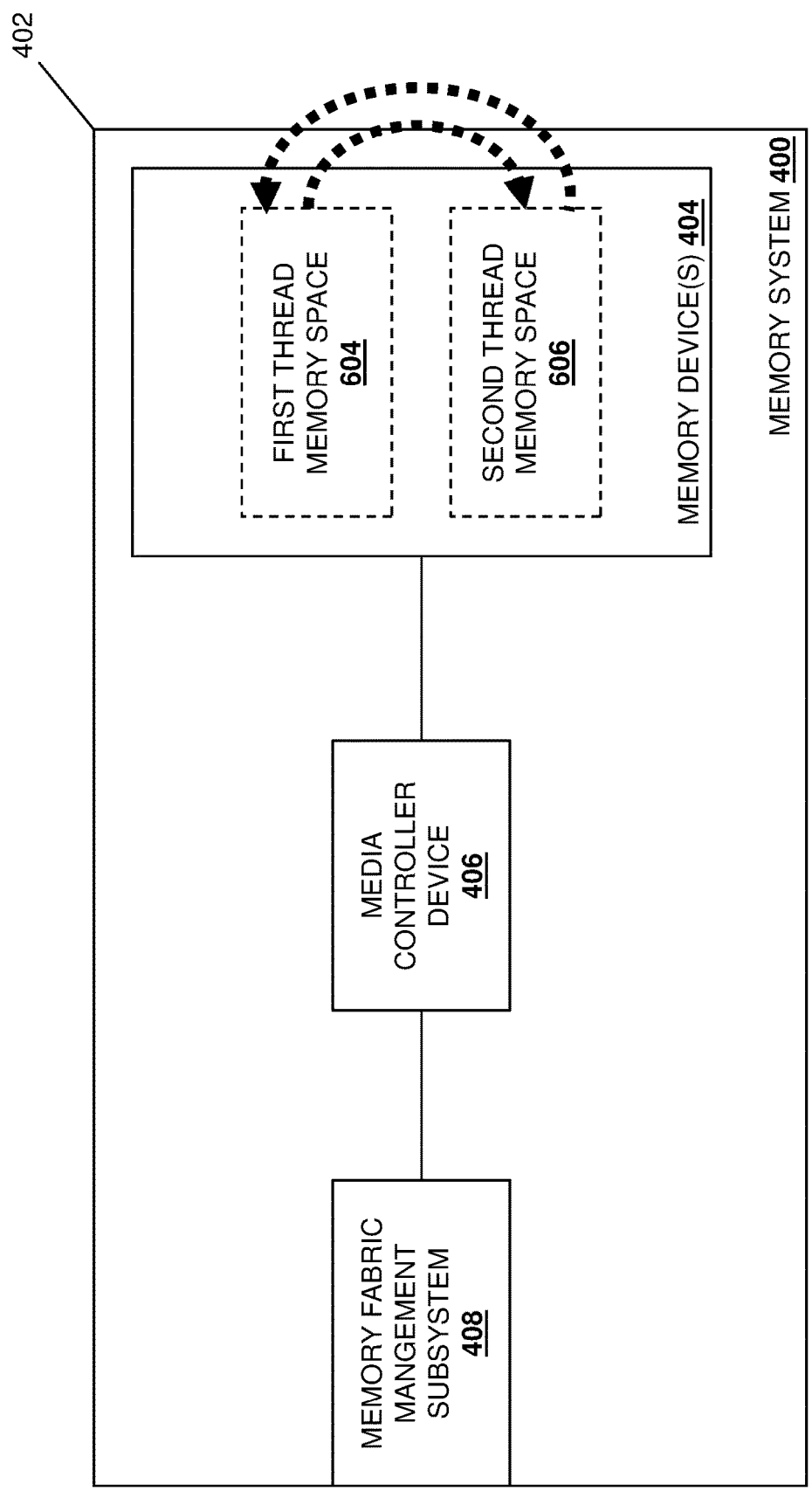
FIG. 9 is a schematic view illustrating an embodiment of the memory system of FIG. 4 operating during the method of FIG. 5.

As will be appreciated by one of skill in the art in possession of the present disclosure, the notation reference information modification performed at block 512 and 514 may be performed at substantially the same time and/or as part of similar operations such that the first thread memory space 604 and the second thread memory space 606 in the memory device(s) 404 in the memory system have their allocations (i.e., to the threads 600a and 602a, respectively) "swapped", as illustrated in FIG. 9 (which one of skill in the art in possession of the present disclosure will recognize is accomplished entirely by the modifications of the notational reference information in the switch memory fabric management database 306, and does not require data movement actions to be performed within the memory system 210/400.) As such, blocks 512 and 514 may provide for the swapping of reference pointers in the switch memory fabric management database 306 that map the thread 600a to the first thread memory space 604 and that map the thread 602a to the second thread memory space 606 such that the thread 600a is mapped to the second thread memory space 606 and the thread 602a is mapped to the first thread memory space 604, and the swapping of page ownership information that provides the thread 600a ownership of the first thread memory space 604 and that provides the thread 602a ownership of the second thread memory space 606 such that the thread 600a owns the second thread memory space 604 and the thread 602a owns the first thread memory space 604.

In many embodiments, the portions of the memory system 210/400 being swapped may be equal sized portions of the memory system 210/400 so that the first thread transferring data to the second thread does not lose allocated memory as a result of the method 500. As such, the first thread memory space 604 may be equal in size to the second thread memory space 606 so that the thread 602a does not lose allocated memory in the "transfer" of the data in the second thread memory space 606 to the thread 600a. In some embodiments, the portion of memory allocated to the second thread that is provided to the first thread that is "transferring" the data during the method 500 may be selected to have the same size as the portion of the memory allocated to the first thread that stores that data prior to "transfer" (e.g., the second thread memory space 606 in the example above). As such, the first thread memory space 604 may be identified during the method 500 for reallocation to the thread 602a based on it being currently allocated to the thread 600a and having a size that is equal to the second thread memory space 606 that stores the data being "transferred" at the request of the thread 602a. However, while a specific example of the swapping of memory space allocations having equal sizes has been described, one of skill in the art in possession of the present disclosure will recognize that different sized memory spaces may be swapped in other embodiments. Furthermore, in some embodiments, block 514 may be skipped such that the first thread (e.g., the thread 602a in the examples below) ends up losing allocated memory as part of the notational reference information modification data "transfer".

Figure 10A:
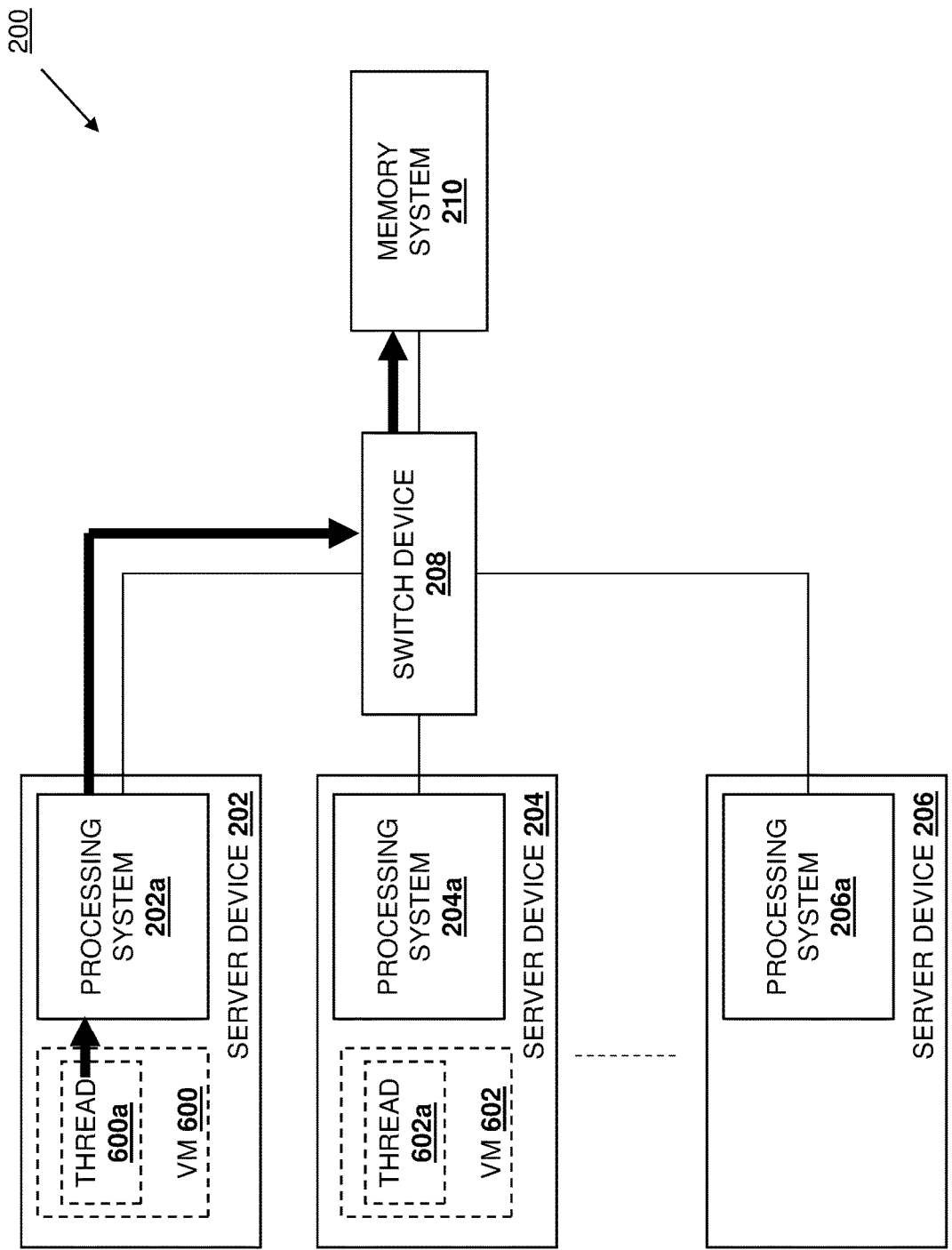
FIG. 10A is a schematic view illustrating an embodiment of a server device in the networked system of FIG. 2 operating during the method of FIG. 5.
Figure 10B:
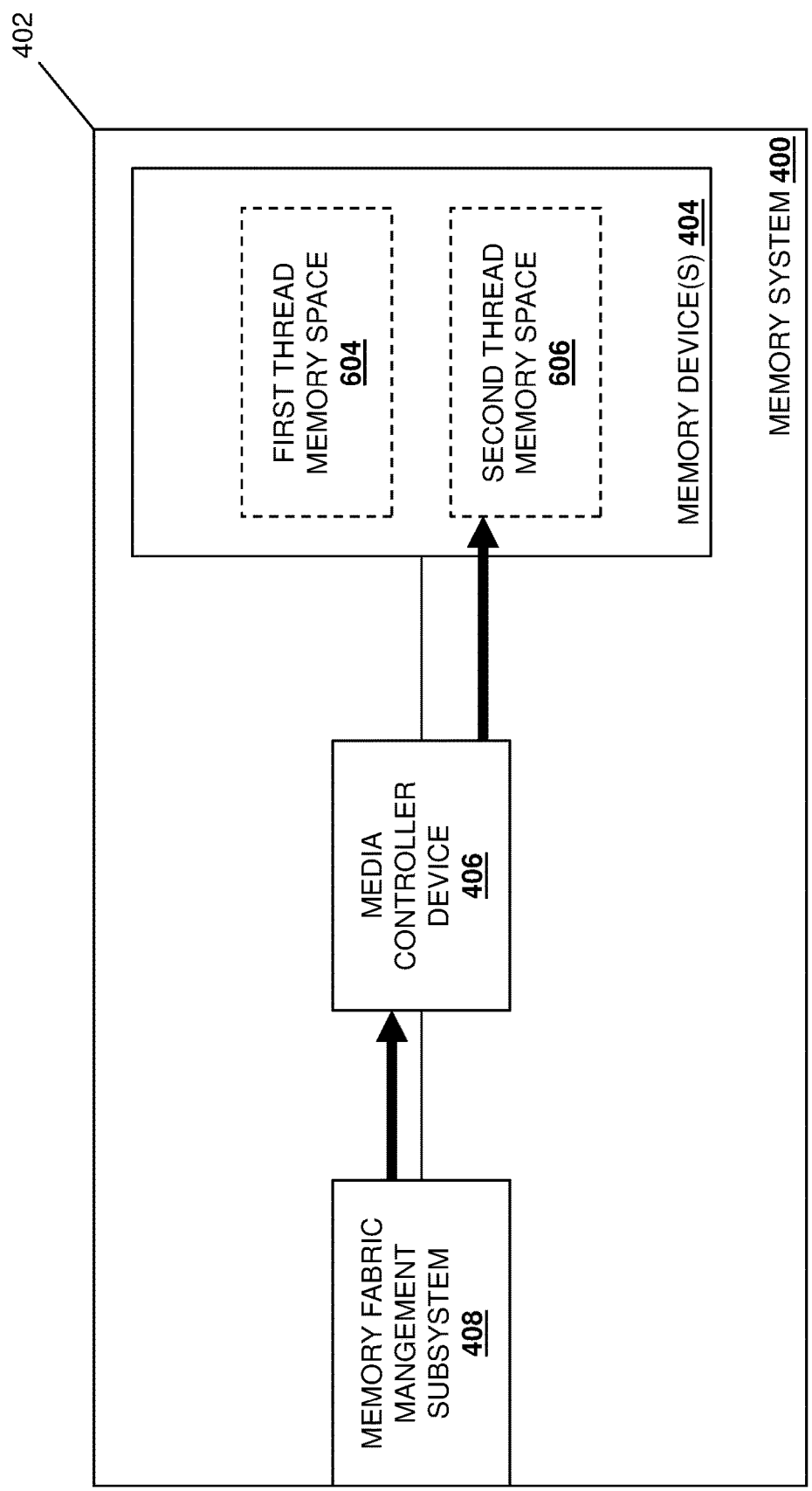
FIG. 10B is a schematic view illustrating an embodiment of the memory system of FIG. 4 operating during the method of FIG. 5.
Figure 10C:
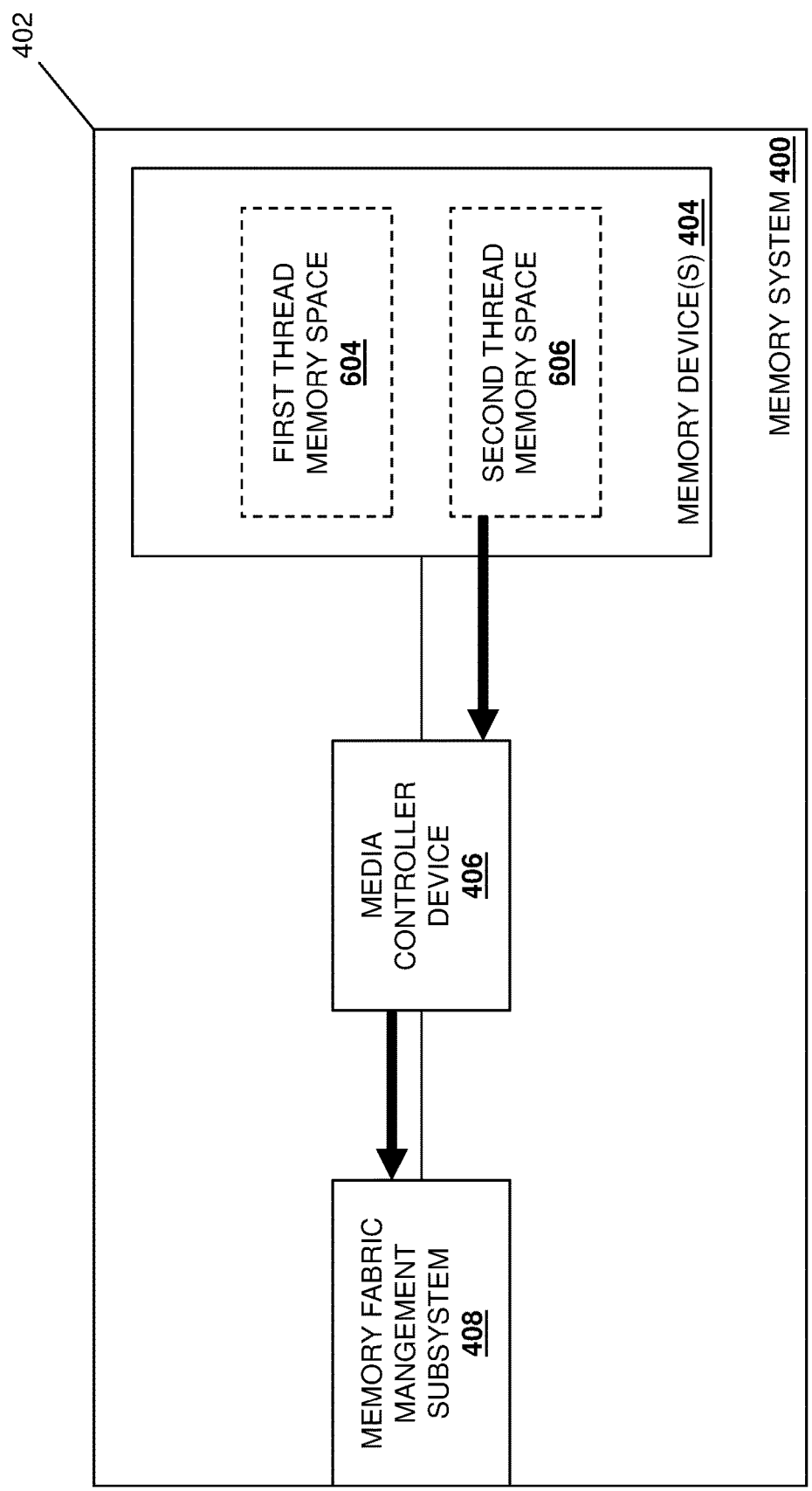
FIG. 10C is a schematic view illustrating an embodiment of the memory system of FIG. 4 operating during the method of FIG. 5.
Figure 10D:
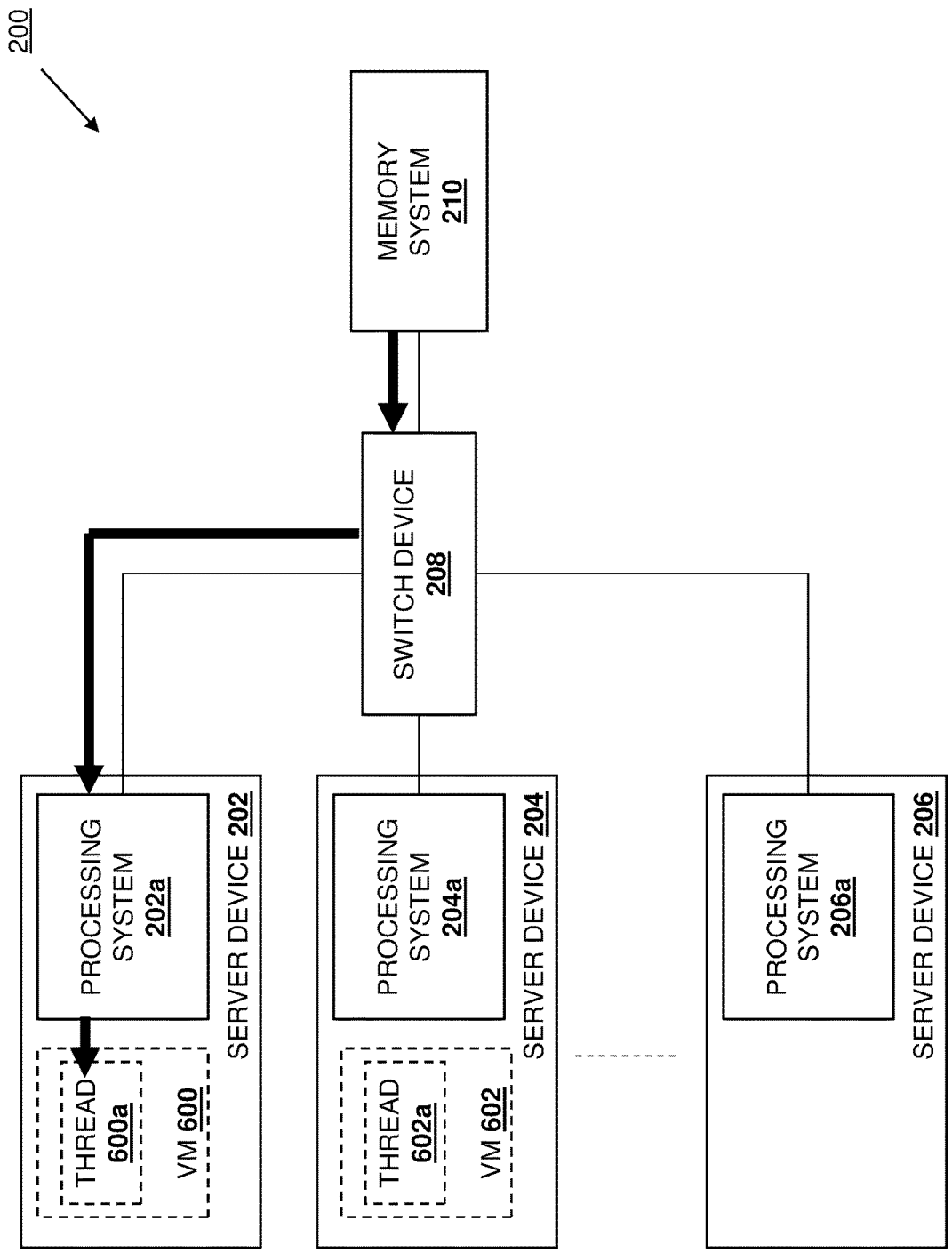
FIG. 10D is a schematic view illustrating an embodiment of a server device in the networked system of FIG. 2 operating during the method of FIG. 5.

The method 500 proceeds to block 512 where the second thread accesses data in the first portion of the memory system. In an embodiment, at block 512, the thread 600a may now access the data in the second thread memory space 606 via, for example, request/respond operations. FIG. 10A illustrates the thread 600a generating and transmitting a memory load instruction via the processing system 202a in the server device 202 and through the switch device 208 such that it is received by the switch memory fabric management subsystem 304 in the switch device 208/300 (e.g., via the communication subsystem 308), with that memory load instruction requesting the data "transfer" by the thread 602a as discussed above. The switch memory fabric management subsystem 304 may then act as a memory fabric requester (e.g., a Gen-Z requester) and utilize the notation reference information in the switch memory fabric management database 306 to generate a memory fabric request (e.g., a Gen-Z request) that is transmitted via the communication subsystem 308 to the memory system 210. As illustrated in FIGS. 10B and 10C, the memory fabric management subsystem 408 may act as a memory fabric responder (e.g., a Gen-Z responder) and retrieve the data via the media controller device 406 and from the second thread memory space 606 in the memory device(s) 404, generate a memory fabric response (e.g., a Gen-Z response) that includes the data retrieved from the second thread memory space 606 as its payload, and transmit that memory fabric response through the switch device 208. FIG. 10D illustrates how the memory fabric management subsystem 304 in the switch device 206/300 may receive the memory fabric response and act as a memory fabric requester to load the data retrieved from the second thread memory space 606 in a local memory system provided for the virtual machine 600 and accessible to the thread 600a. However, while a specific example of the accessing of data in the first portion of the memory system by the second thread has been described, one of skill in the art in possession of the present disclosure will recognize that data transferred via the notational reference information modifications described herein may be accessed in a variety of manners that will fall within the scope of the present disclosure as well.

Thus, systems and methods have been described that provide for the "transfer" of data, while avoiding the need to read, write, copy, and/or perform other conventional data transfer operations that actually move data between memory fabric address spaces, by changing the allocations of portions of a memory system in a memory fabric between a thread that requests to transfer that data and a thread to which the transfer of that data is requested. As such, a first thread included in a first virtual machine provided by a first processing system in a first server device may request to transfer data to a second thread included in a second virtual machine provided by a second processing system in a second server device, and a switch device coupling those server devices to a memory fabric memory system may identify that request to transfer data. In response, the switch device may modify notational reference information in a database in order to swap a first portion of the memory fabric memory system that is allocated to the first thread and that stores the data to-be transferred with some equal sized portion of the memory fabric memory system that is allocated to the second thread, which allows the second thread to reference the data in the first portion of the memory fabric memory system using request/respond operations. As such, more efficient inter-device memory-fabric-based data transfers are provided that eliminate the need to perform conventional data transfer operations that actually move the data between memory fabric address spaces, while providing the effect of such data movement by notational reference modifications that reallocate portions of the memory fabric.

Furthermore, the present disclosure is being filed along with U.S. patent application Ser. No. 16/395,902, filed on Apr. 26, 2019, and directed to controller-based inter-device notational data movement techniques; and U.S. patent application Ser. No. 16/396,433, filed on Apr. 26, 2019, and directed to intra-device notational data movement techniques; each of which include embodiments that utilize notational data movement systems similar to those described in some of the embodiments included in the present disclosure. One of skill in the art in possession of the present disclosure will recognize how embodiments of the present disclosure may be combined with some or all of the disclosures discussed above, and thus those disclosures are incorporated by reference herein in their entirety.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A data movement system, comprising:
 a first processing system that is configured to provide a first data utilization subsystem;
 at least one second processing system that is configured to provide a second data utilization subsystem;
 a memory system; and
 a networking device that is coupled to the first processing system, the at least one second processing system, and the memory system, wherein the networking device is configured to:
  identify, in a communication transmitted by the first data utilization subsystem, a request to transfer data to the second data utilization subsystem, wherein the data is stored in a first portion of the memory system that is associated with the first data utilization subsystem in a memory fabric management database; and modify, in the memory fabric management database, data association information in order to disassociate the first portion of the memory system and the first data utilization subsystem and associate the first portion of the memory system with the second data utilization subsystem, wherein the association of the first portion of the memory system with the second data utilization subsystem allows the second data utilization subsystem to access the data using a data access operation.

2. The system of claim 1, wherein the networking device is configured to:
modify, in the memory fabric management database, the data association information in order to disassociate a second portion of the memory system and the second data utilization subsystem and associate the second portion of the memory system with the first data utilization subsystem.

3. The system of claim 2, wherein the first portion of the memory system and the second portion of the memory system are the same size.

4. The system of claim 2, wherein the disassociation of the first portion of the memory system and the first data utilization subsystem, the association of the first portion of the memory system with the second data utilization subsystem, the disassociation of the second portion of the memory system and the second data utilization subsystem, and the association of the second portion of the memory system with the first data utilization subsystem includes:
swapping mapping elements that map the first data utilization subsystem to the first portion of the memory system and that map the second data utilization subsystem to the second portion of the memory system.

5. The system of claim 2, wherein the disassociation of the first portion of the memory system and the first data utilization subsystem, the association of the first portion of the memory system with the second data utilization subsystem, the disassociation of the second portion of the memory system and the second data utilization subsystem, and the association of the second portion of the memory system with the first data utilization subsystem includes:
swapping ownership elements that provides the first data utilization subsystem ownership of the first portion of the memory system and that provides the second data utilization subsystem ownership of the second portion of the memory system such that the second data utilization subsystem owns the first portion of the memory system and the first data utilization subsystem owns the second portion of the memory system.

6. The system of claim 1, wherein the request to transfer data is included in an Inter-Process Communication (IPC).

7. An Information Handling System (IHS), comprising:
a first processing system; and
a memory system that is coupled to the first processing system and that includes instructions that, when executed by the first processing system, cause the first processing system to provide a memory fabric management engine that is configured to:
identify, in a communication transmitted by a first data utilization subsystem that is provided by at least one second processing system, a request to transfer data to a second data utilization subsystem that is provided by the at least one second processing system, wherein the data is stored in a first portion of a memory system that is coupled to the memory fabric management engine and that is associated with the first data utilization subsystem in a memory fabric management database; and
modify, in the memory fabric management database, data association information in order to disassociate the first portion of the memory system and the first data utilization subsystem and associate the first portion of the memory system with the second data utilization subsystem, wherein the association of the first portion of the memory system with the second data utilization subsystem allows the second data utilization subsystem to access the data using a data access operation.

8. The IHS of claim 7, wherein the memory fabric management engine is configured to:
modify, in the memory fabric management database, the data association information in order to disassociate a second portion of the memory system and the second data utilization subsystem and associate the second portion of the memory system with the first data utilization subsystem.

9. The IHS of claim 8, wherein the first portion of the memory system and the second portion of the memory system are the same size.

10. The IHS of claim 8, wherein the disassociation of the first portion of the memory system and the first data utilization subsystem, the association of the first portion of the memory system with the second data utilization subsystem, the disassociation of the second portion of the memory system and the second data utilization subsystem, and the association of the second portion of the memory system with the first data utilization subsystem includes:
swapping mapping elements that map the first data utilization subsystem to the first portion of the memory system and that map the second data utilization subsystem to the second portion of the memory system.

11. The IHS of claim 8, wherein the disassociation of the first portion of the memory system and the first data utilization subsystem, the association of the first portion of the memory system with the second data utilization subsystem, the disassociation of the second portion of the memory system and the second data utilization subsystem, and the association of the second portion of the memory system with the first data utilization subsystem includes:
swapping ownership elements that provides the first data utilization subsystem ownership of the first portion of the memory system and that provides the second data utilization subsystem ownership of the second portion of the memory system such that the second data utilization subsystem owns the first portion of the memory system and the first data utilization subsystem owns the second portion of the memory system.

12. The IHS of claim 7, wherein the request to transfer data is included in an Inter-Process Communication (IPC).

13. The IHS of claim 7, wherein the memory fabric management engine is configured to:
snoop the communication transmitted by the first data utilization subsystem to identify the request to transfer data to the second data utilization subsystem.

14. A method for providing data movement, comprising:
identifying, by a networking device in a communication transmitted by a first data utilization subsystem that is provided by a first processing system, a request to transfer data to a second data utilization subsystem that is provided by a second processing system, wherein the data is stored in a first portion of a memory system that is coupled to the networking device and that is associated with the first data utilization subsystem in a memory fabric management database; and modifying, by the networking device in the memory fabric management database, data association information in order to disassociate the first portion of the memory system and the first data utilization subsystem and associate the first portion of the memory system with the second data utilization subsystem, wherein the association of the first portion of the memory system with the second data utilization subsystem allows the second data utilization subsystem to access the data using a data access operation.

15. The method of claim 14, further comprising:

modifying, by the networking device in the memory fabric management database, the data association information in order to disassociate a second portion of the memory system and the second data utilization subsystem and associate the second portion of the memory system with the first data utilization subsystem.

16. The method of claim 15, wherein the first portion of the memory system and the second portion of the memory system are the same size.

17. The method of claim 15, wherein the disassociation of the first portion of the memory system and the first data utilization subsystem, the association of the first portion of the memory system with the second data utilization subsystem, the disassociation of the second portion of the memory system and the second data utilization subsystem, and the association of the second portion of the memory system with the first data utilization subsystem includes:

swapping mapping elements that map the first data utilization subsystem to the first portion of the memory system and that map the second data utilization subsystem to the second portion of the memory system.

18. The method of claim 15, wherein the disassociation of the first portion of the memory system and the first data utilization subsystem, the association of the first portion of the memory system with the second data utilization subsystem, the disassociation of the second portion of the memory system and the second data utilization subsystem, and the association of the second portion of the memory system with the first data utilization subsystem includes:

swapping ownership elements that provides the first data utilization subsystem ownership of the first portion of the memory system and that provides the second data utilization subsystem ownership of the second portion of the memory system such that the second data utilization subsystem owns the first portion of the memory system and the first data utilization subsystem owns the second portion of the memory system.

19. The method of claim 14, wherein the request to transfer data is included in an Inter-Process Communication (IPC).

20. The method of claim 14, further comprising:

snooping, by the networking device, the communication transmitted by the first data utilization subsystem to identify the request to transfer data to the second data utilization subsystem.

* * * * *

UNITED STATES PATENT AND TRADEMARK OFFICE
CERTIFICATE OF CORRECTION

PATENT NO. : 11,281,612 B2
APPLICATION NO. : 17/094217
DATED : March 22, 2022
INVENTOR(S) : Bowman et al.

It is certified that error appears in the above-identified patent and that said Letters Patent is hereby corrected as shown below:

In the Specification

Column 3, Line 36, "FIG. 100" should be changed to --FIG. 10C--.

Signed and Sealed this
Twenty-eighth Day of June, 2022

Katherine Kelly Vidal
*Director of the United States Patent and Trademark Office*